Oct. 14, 1969  R. M. LOOMIS  3,472,180
SIDE FILLER

Original Filed Aug. 30, 1965  3 Sheets-Sheet 2

Inventor:
Russell M. Loomis

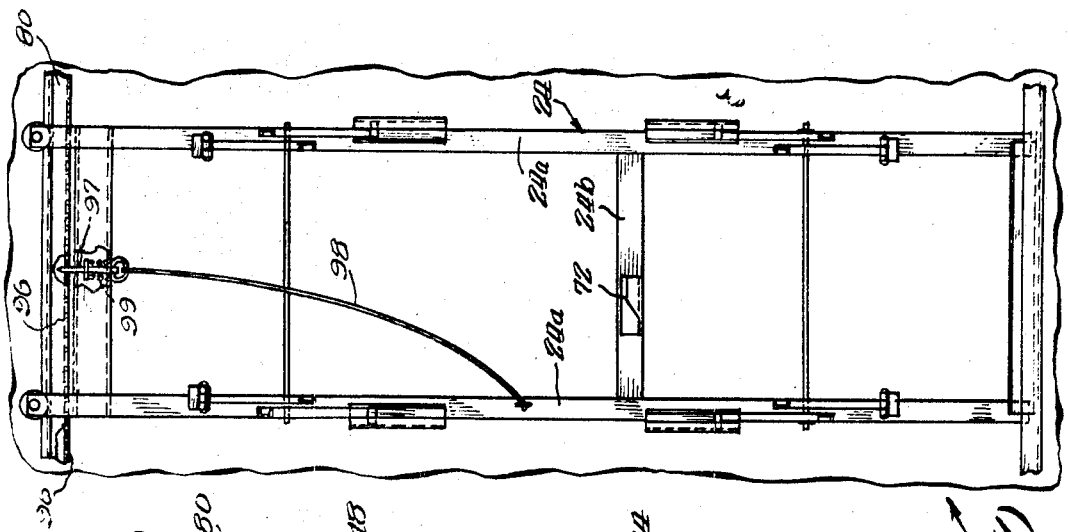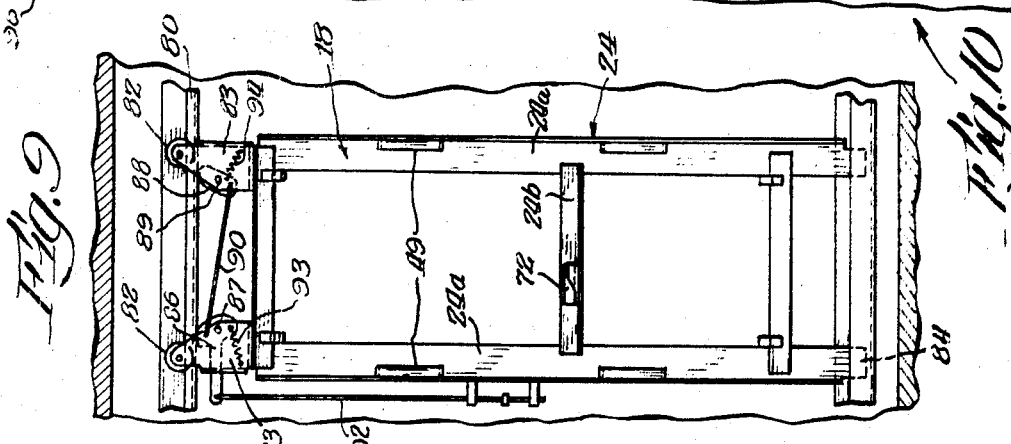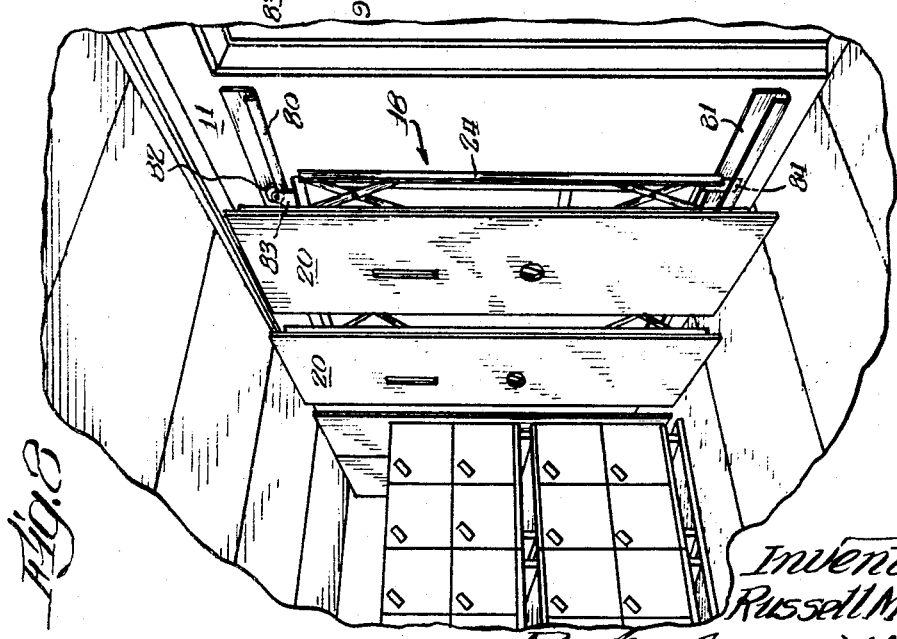

United States Patent Office 3,472,180
Patented Oct. 14, 1969

3,472,180
SIDE FILLER
Russell M. Loomis, Palos Heights, Ill., assignor to Unarco Industries, Inc., a corporation of Illinois
Continuation of application Ser. No. 483,566, Aug. 30, 1965. This application Aug. 27, 1968, Ser. No. 778,881
Int. Cl. B61d 45/00
U.S. Cl. 105—369           6 Claims

ABSTRACT OF THE DISCLOSURE

A side filler having a frame movable along the side wall of a railway car or the like on elongated supporting tracks, latch means to latch the frame against movement, a panel, crossed pivoted legs adjustably mounting the panel on the frame, and a rotatable rod on the panel formed with rack teeth to engage a crossbar on the legs to hold the legs in adjusted position.

---

This application is a continuation of application Ser. No. 483,566, filed Aug. 30, 1965, now abandoned.

This invention relates to side fillers and, more particularly, to adjustable side fillers for use in railway cars, trucks, trailers and the like.

In shipping various types of goods in packages or cartons, it often becomes necessary to confine the goods against lateral shifting in the car, as well as against longitudinal shifting. The goods may be effectively held against longitudinal shifting by lading-separating doors such as, for example, the type particularly disclosed and claimed in Patent No. 3,018,741.

To prevent lateral shifting, it is desirable to provide a side filler in the car by which the effective interior width of the car can be varied to confine the cartons or packages from side to side of the car. For most types of service, it is desirable that the side filler be adjustable to a plurality of positions so as to accommodate a variety of sizes of cartons or packages.

It is further desirable at times that the side filler be adjustable longitudinally of the car so as to accommodate loads of various lengths. Adjustment of the side filler longitudinally will obviate interference between the side filler and the lading-separating door when the lading-separating door or divider bulkhead is placed against the load for shipment.

Therefore, one object of the present invention is to provide an improved side filler which is simple and inexpensive to manufacture and which is adjustable through a plurality of positions to meet the requirements of substantially any type of service.

Another object of the present invention is to provide an improved side filler adjustable to vary the width of a storage compartment in a railway car by means of scissor-like legs operatively secured to a support frame and to an elongated vertically disposed panel of the side filler, the panel being adjustable by actuating means accessible from the front of the panel or from the side of the panel.

It is another object of this invention to provide an improved side filler including a vertically disposed panel mounted on a support frame by means of crossed, scissor-like legs, said legs being locked in selected adjusted position by means of reliable, yet simple rotatable lock means.

Yet another object of the present invention is to provide an adjustable side filler for varying the effective interior width of a storage compartment, such side filler including an elongated panel adjustably carried on a support frame by crossed leg means, which side filler is also adjustable longitudinally in the storage compartment to accommodate loads of various lengths so that there will be no interference with the lading-separating doors utilized to prevent longitudinal shifting of the load during shipment. These and other objects of the present invention will become more apparent hereafter.

The specific details of the invention and their mode of functioning will be made most manifest and particularly pointed out in clear, concise and exact terms in conjunction with the accompanying drawings, wherein:

FIG. 4 is an enlarged detail view taken generally along the line 4—4 of FIG. 3 and, more particularly, illustrating the coaction of the lock means with the crossed leg means;

FIG. 5 is an enlarged detail view taken generally along the line 5—5 of FIG. 2 further illustrating the coaction of the rack means of the lock mechanism with the crossed leg means;

FIG. 6 is an enlarged detail view taken generally along the line 6—6 of FIG. 2 and better illustrating the manner of rotating the positioning shaft;

FIG. 7 is an enlarged detail view taken generally along the line 7—7 of FIG. 2 and further illustrating the interengagement of the rack means on the lock mechanism with the crossed leg means;

FIG. 8 is a fragmentary perspective view of a railway car illustrating a modified side filler adapted for adjusting the effective width of the railway car and supported for movement longitudinally of the railway car;

FIG. 9 is an elevation view of the side filler of FIG. 8 showing a cam arrangement for retaining the side filler in selected adjusted position; and FIG. 10 is an elevation view illustrating a modified arrangement for longitudinally adjusting a side filler in a railway car.

Figure 1:
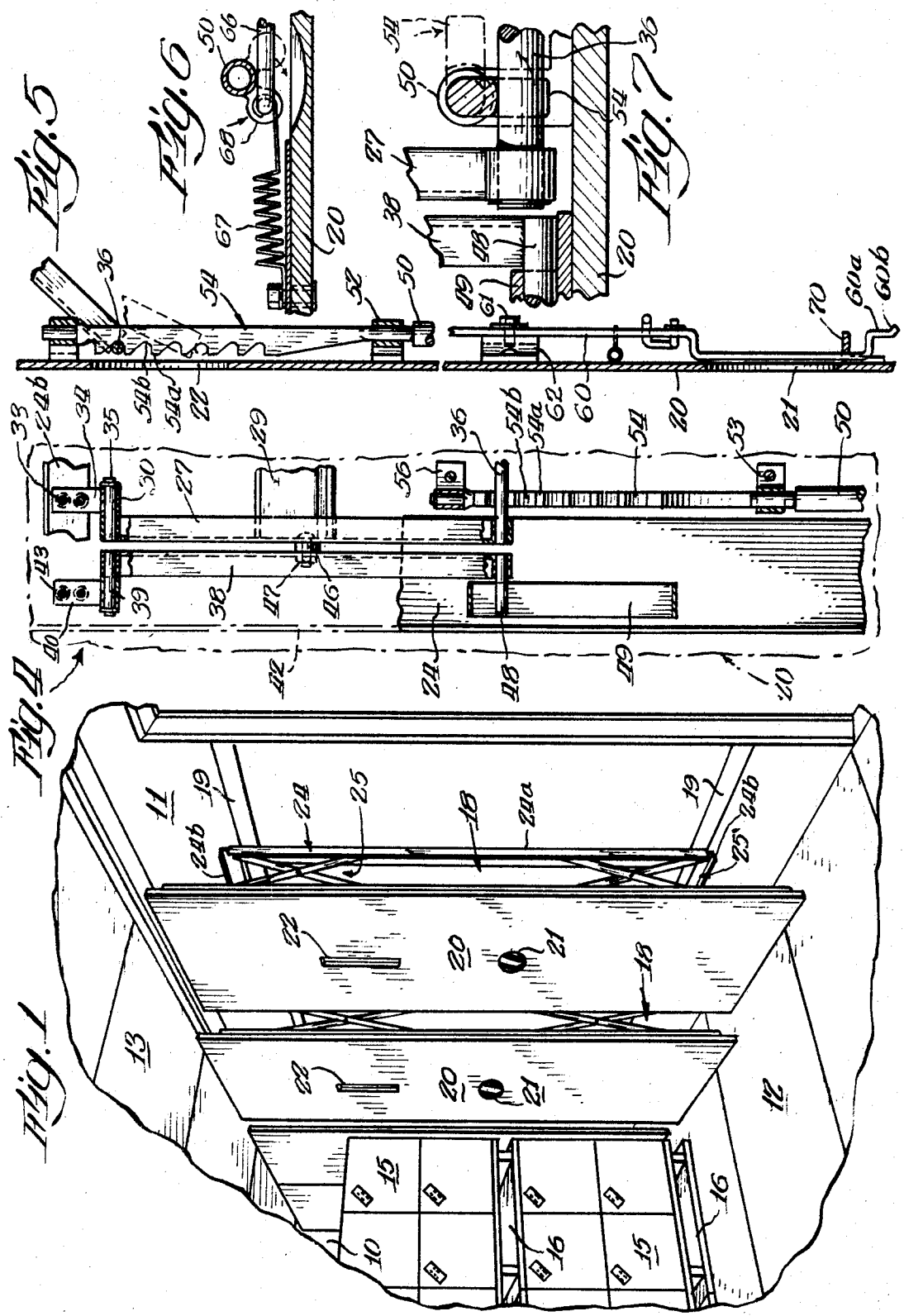
FIG. 1 is a fragmentary perspective view of a railway car illustrating a side filler embodying the principles of the present invention.

Referring now to FIG. 1, there is illustrated a conventional type of railway car having an end wall 10, spaced side walls 11, a floor 12 and a ceiling or roof 13.

The cartons or packages 15 are adapted to be supported on racks or pallets 16 within the storage compartment defined in the railway car and, as shown in FIG. 1, the pallets may be stacked one atop another.

The side filler unit 18 of the present invention is adapted to be supported directly on the side wall 11 or on horizontally elongated strips 19 secured to a side wall 11 or to an inner liner, if an inner liner be used. The side filler 18 comprises a panel 20 which may be made of plywood or other desired type of material. Preferably, standard size plywood sheets are employed that are approximately three feet wide by approximately nine feet high. It will be understood that these dimensions can be varied as desired, depending upon the particular installation. The panels 20 are generally rectangular and are preferably provided with an opening 21 to permit access to an actuating means for facilitating adjustment of the panel 20 with respect to the wall and an elongated generally vertically disposed slot-like opening 22 for permitting the operator to readily gauge the distance panel 20 extends from the wall so as to facilitate the desired adjustment of the panel. The function of the elongated slot-like opening 22 will be explained more fully hereafter.

The side filler unit 18 includes wall frame 24 fixedly connected to the strips 19 on the wall 11 of the railway car, a panel frame comprising a pair of spaced parallel panel frame members affixed to panel 20, the panel 20 and scissor-like crossed leg means 25 and 25' operatively connected between the wall frame and the panel frame for permitting adjustment of the panel 20 with respect to the side wall 11 of the railway car so as to vary the effective width of the compartment in the railway car. The wall frame 24 comprises vertically disposed members 24a and cross braces 24b. When no longitudinal movement of the side filler unit 18 is necessary, the wall frame 24 may be omitted and the crossed leg means may be operatively connected between the panel frame and the side wall 11.

Figure 2:
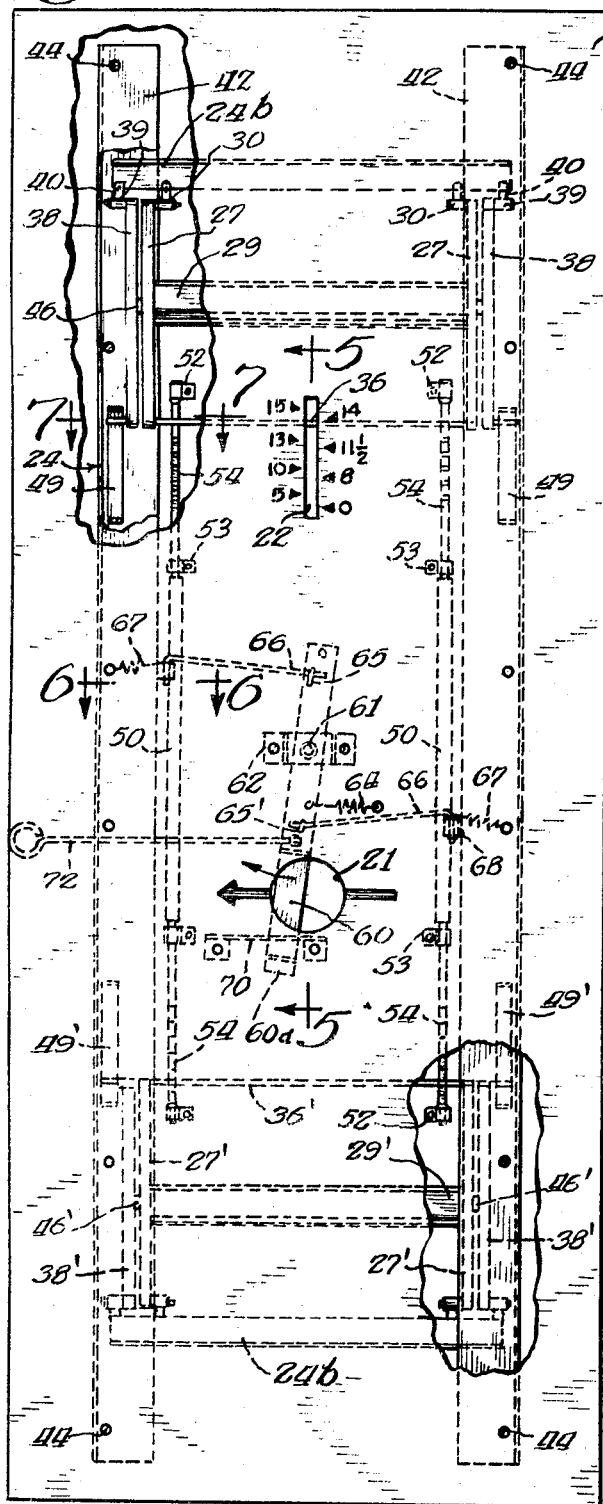
FIG. 2 is a front elevation view of the side filler of FIG. 1.
Figure 3:
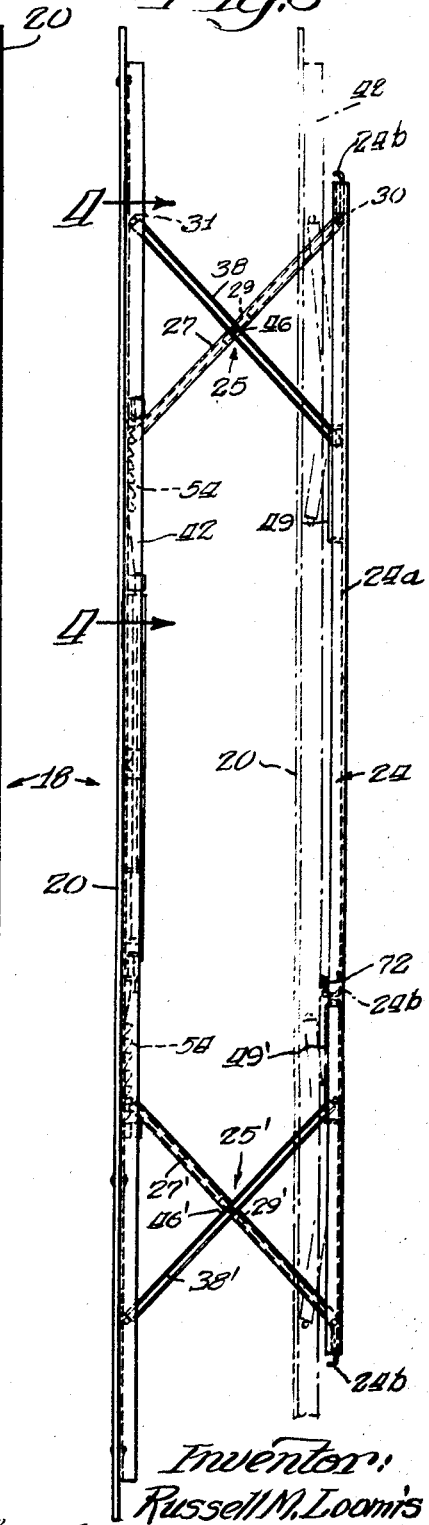
FIG. 3 is a side view of the side filler, illustrating the side filler in its extended operating position.

Turning now to FIGS. 2, 3 and 4, there is better seen the detail of the crossed leg means and the cooperation between the crossed leg means 25, 25', the wall frame 24 and the panel 20. As the upper crossed leg means 25 and the lower crossed leg means 25' are basically the same in terms of structure and function, the upper crossed leg means 25 will be explained in detail hereafter and only the variances will be described with respect to the lower crossed leg means 25'.

The upper crossed leg means 25 includes a cross leg weldment, crossbar 36 and cross legs 38. The cross leg weldment is comprised of parallel spaced side members 27 interconnected by a cross piece 29 so as to define an H-shaped member. Affixed at the upper end of each of the side members 27 is an inwardly extending cross leg pin 30. The pins 30 are journaled in hanger brackets or leg bearings 34 suitably connected to the wall frame 24. The hanger brackets 34 may be detachably affixed to the wall frame by suitable fastening means 33, as for example, bolts and nuts. The pins 30 are retained in the hanger brackets 34 by means of suitable retaining ring means 35.

The ends of the parallel side members 27 of the cross leg weldment opposite from the pins 30 are rigidly joined by a crossbar 36.

Pivotally joined to the cross leg weldment exteriorly of each of the side members 27 are cross legs 38. Affixed at one end of each leg 38 is a pin 39 which is adapted to be journaled in a hanger bracket or leg bearing 40, which is carried on the panel frame member 42. The brackets 40 are detachably secured to the panel frame member by suitable fastening means 43, for example, nuts and bolts. Each panel frame member 42 is operatively connected to the panel 20 by means of suitable fastening bolts 44.

Intermediate its ends, each leg 38 is pivotally connected to the cross leg weldment by means including pivot pin 46 and lock nut 47. Fixedly secured to the end of each leg 38 opposite from pin 39 is a pin 48 which is adapted to be slidably guided in the guide means 49 formed on the wall frame member 24.

It will be understood from the foregoing that the upper ends of each leg member 27 and 38 of the upper crossed leg means 25 are pivotally affixed to the wall frame 24 and the panel frame 42, respectively, and are not constructed and arranged for vertical movement. The lower ends of the legs 38 are guided for reciprocable movement by the pins 48 moving in guide means 49. Crossbar 36 is guided for vertical movement between the rear of panel 20 and rack 54 on bar 50. Thus, it will be understood that the legs may be moved from a fully extended position, as indicated in FIG. 3, to a collapsed position wherein the panel 20 and panel frame are immediately adjacent the wall frame 24. In a presently preferred form of the invention, the panel 20 is adjustable a distance of 16 inches from the wall frame 24.

The lower leg means 25' are constructed in the same manner as the upper leg means 25 except that the lower ends of the cross legs 27' and 38' are journaled on the wall frame 24 and panel frame 42, respectively, without provision for vertical movement. The upper ends of the legs 38' are permitted to move vertically in the guide means 49' on the wall frame 24. The crossbar 36' is guided for vertical movement between panel 20 and rack 54 on positioning bar 50. It will be understood by those skilled in the art that only a single crossed leg means may be utilized at each side of a relatively short panel and that upper and lower pairs of crossed leg means are used for relatively long panels.

A feature of the invention is the lock means for retaining the panel 20 in selected position with respect to the side wall. The lock means comprise a positioning bar or rod 50 journaled in end brackets 52 and intermediate brackets 53 suitably affixed to the panel 20, the bar 50 being journaled for rotation about a vertical axis. Provided adjacent each end of the positioning bar 50 is a rack 54 comprised of a plurality of spaced teeth 54a and grooves 54b. In use, it is understood that the crossbars 36 will be engaged with a selected groove 54b of the upper and lower racks 54 to retain the crossed leg means 25 and 25', respectively, in selected adjusted position.

Actuating means are provided for rotating the positioning bar 50 so as to enable the desired adjustment of the panel 20 with respect to the wall frame 24. The actuating means comprise an operator handle 60 pivotally secured intermediate its ends, as indicated at 61, to the panel 20 by a bracket 62. The handle 60 is biased toward a locked position wherein the racks 54 are in engagement with the crossbars 36 and 36' by a suitable spring 64. As clearly seen in FIG. 2, the operator handle 60 is accessible through the opening 21 in the panel 20. The handle 60 is operatively connected to simultaneously rotate the positioning bars 50 by means of the pull rods 66, which are each connected at the inner ends thereof to the handle 60 by suitable lost motion means 65 and 65' and which are pivotally connected at the outer ends thereof to brackets 68 carried on the positioning rods 50.

Referring now to FIGS. 5, 6 and 7, it will be noted that to lock the crossbars 36 and 36' in selected adjusted position, the rack grooves 54b are engaged with the crossbars 36 and 36'. This provides for a stable locking of the panel 20 in a selected position. When it is desired to adjust the panel, the operator has access to the handle 60 through the opening 21 (FIG. 2). Pivoting the handle 60 about the axis of pivot pin 61 will cause each pull rod 66 to rotate a respective positioning shaft or rod 50 to release the rack grooves 54b from engagement with the crossbars 36 and 36'. The operator may then either push or pull the panel 20 to a new selected position. Upon release of the handle 60 by the operator, the spring 64 will urge the handle toward a locked position wherein the positioning bars will be rotated to lock the crossbars 36, 36' in place. Spring means 67, which are operative between the panel 20 and the bracket 68 on the positioning bars 50 function to rotate the positioning bars toward their locked position in engagement with crossbars 36, 36'. The lost motion in the handle connections 65 and 65' permit the handle 60 to move to locked position.

The lower end of the handle 60 is adapted to move in the U-shaped guide 70. The guide maintains the desired positioning of the handle 60 with respect to the panel 20 and also the ends or arms of the guide function as stops to limit travel of the handle 60.

In stored position, the side filler unit 18 must be locked against the wall or the wall frame independently, as the flat arc of the collapsed crossed legs does not always provide a firm lock. This wall lock is provided by slipping the offset end 60a (FIGS. 1 and 5) of handle 60 inside the hook bracket 72 (FIG. 3) on the intermediate wall frame crossbar 24b. One corner of the operator handle 60 may be crimped as indicated at 60b on FIG. 5 to assist in the locking action between the hook bracket 72 and the end 60a of handle 60.

Another feature of the present invention is the provision of auxiliary actuating means to permit adjustment of the side filler in the event that lading blocks access to the opening 21. Such auxiliary actuating means comprise a handle extension 72 which is operatively connected at one end to the handle 60 and which extends outwardly from the side of the panel 20 so as to be accessible from the side of the side filler unit 18.

It will be noted that suitable indicia are provided adjacent the elongated slot-like opening 22, which indicia are indicatve of the extent the panel 20 is spaced from the wall frame 24. As best seen in FIG. 2, the crossbar 36 is visible through the opening 22 and the position of the crossbar with respect to the indicia will indicate to the operator the adjusted position of the panel 20 from the wall.

A further feature of the present invention is the novel manner of longitudinally adjusting the side filler unit 18 in the railway car. Considering FIG. 8, there is noted a plurality of side filler units 18 which may be of the type illustrated in FIGS. 1–7. Provided on the side walls 11 of the railway car are track means for engaging with and guiding movement of the side filler units 18 longitudinally of the railway car. The upper and lower track means 80 and 81, respectively, may comprise generally J-shaped members affixed to the side of the railway car. Complementary means are provided on the wall frame member 24 of the side filler unit 18 to engage with the track means 80 and 81, respectively. Such means comprise a plurality of rollers 82 rotatably supported on a bracket 83 affixed to the upper end of wall frame 24, such rollers 82 being movable in the track defined by the horizontally disposed track member 80. Depending from the lower end of each of the side rails or side members of the wall frame 24 are legs 84 which are adapted to engage in the track 81. Thus, it is evident that the side filler units 18 may be readily moved longitudinally of the railway car and guided in such movement by the cooperation between the rollers 82 with track 80 and the cooperation between legs 84 and track 81.

Turning now to FIGS. 9 and 10, there are illustrated two embodiments of means for fixing the side filler unit 18 in selected adjusted position longitudinally of the car.

As shown in FIG. 9, the means for retaining the side filler unit 18 in selected adjusted position comprise a pair of cams 86 and 88, respectively, which are each pivotally secured on a bracket 83 as indicated at 87 and 89 and are movable into engagement with the bottom exterior surface of the guide track 80. The cams 86 and 88 are interconnected by link 90 and are mounted so they are adapted for rotation in opposite directions. An actuating rod 92 is operatively connected to a lever extending from the cam 86 for actuating the cams 86 and 88. It will be understood from FIG. 9, that when the rod 92 is pulled downwardly, the cams 86 and 88 will be pivoted away from engagement with the track 80 to permit longitudinal positioning of the side filler unit 18. When the rod 92 is released, the springs 93 and 94, respectively, will pivot the cams 86 and 88, respectively, toward engaged position with the track to hold the side filler unit 18 in place.

It is noted that a lost motion connection is provided between the ends of the rod 90 and the cams 86 and 88, respectively, so that the cams can act independently against the track under their respective spring loadings.

In FIG. 10, there is illustrated a further modification of the longitudinal adjusting means for the side filler unit 18. As illustrated, the track 80 may be provided with a plurality of openings or recesses 96 spaced therealong. Secured to the wall frame 24 is a spring-loaded pin 97 that is adapted to be engaged with a selected opening or recess 96 in the track 80 for holding the side filler 18 in place. Preferably, the pin 97 is located centrally on the side filler unit 18 and is connected with a flexible cable 98 for actuating the pin in opposition to the spring 99 to release the spring-loaded pin 97 from a selected opening 96 in the track to permit adjustment of the side filler unit 18. Location of the pin 97 adjacent the ends of the side filler unit 18 might cause interference in the event of overlapping of adjacent panels. The central location of the pin 97 obviates this problem.

There has been provided by the present invention a relatively simple and inexpensive side filler unit that is readily adjustable by the operator to vary the effective width of a railway car so as to accommodate a variety of cartons and packages therein. It is a further provision of the invention to provide such adjustable side filler unit having scissor-like crossed leg means with longitudinal adjusting means so as to permit selected positioning of the side filler unit longitudinally of the railway car. In this way, loads of various lengths can be accommodated and there will be no interference with the lading-separating doors normally utilized in railway cars to form separate storage compartments therein.

While presently preferred embodiments of the invention have been described and shown herein, it will be understood that they are illustrative only and not to be taken as a definition of the scope of the invention, reference being had for this purpose to the appended claims.

What is claimed is:

1. A lading filler positioning arrangement for use in a freight-carrying body provided with upright walls, including in combination a vertical panel spaced parallel to a wall of a freight-carrying body, crossed link means attached to said panel to selectively vary the lateral spacing between the panel and wall, an upright planar frame having support means thereon arranged for engaging and supporting the crossed link means to one side thereof whereby said vertical panel is supported in cantilever fashion from said planar frame and the vertical panel is constrained at all times to an attitude parallel to said frame;

elongated support track means mounted on the wall adjacent the top of said planar frame, track-engaging-and-follower means at the upper end of said planar frame cooperating with said support track means for supporting from said support track means the frame and the panel cantilevered therefrom, and permitting selective longitudinal movement of the planar frame along the length of said support track means;

stationary elongated retainer means spaced below and parallel to said elongated track means and defining an elongated retainer groove, and guide means on said planar frame positioned in and moveable longitudinally along said retaining groove, said guide means and retainer means cooperating to constantly guide the panel and planar frame during its said longitudinal movement while simultaneously restraining swinging movement of the lower end of the vertical panel in directions toward and away from the wall, and restraining pivoting movement of said panel in its own plane relative to the track-engaging-and-follower means which engage the track means and preventing pivoting of the vertical panel relative to the side wall about a vertical axis when the lateral spacing between said panel and said wall is being or has been selectively varied.

2. The arrangement of claim 1 including a crossbar carried by said crossed link means and arranged to move in directions longitudinally of the panel in a plane parallel to and closely spaced from the panel, an elongated rod rotatably carried by the panel and extending longitudinally of the panel and spaced from the panel, said crossbar moving between said elongated rod and the panel, spaced stop elements on the elongated rod along a portion of the longitudinal length of the rod, and actuating means for selectively rotating the rod between a first position where the stop elements engage the crossbar and to a second position where there is no obstruction to movement of the crossbar in the space between said panel and rod.

3. The positioning apparatus of claim 2 wherein said spaced stop elements comprise rack means.

4. The positioning apparatus of claim 2 wherein said crossed link means includes two pair of crossed leg links for varying the spacing between the panel and the wall, one of said links of each pair carrying one said crossbar, and said spaced stop elements are engageable with each of said crossbars when said elongated rod is rotated to said first position.

5. The positioning apparatus of claim 2 wherein said elongated rod is constructed and arranged to guide said crossbar during its longitudinal movement when the rod is rotated to said second position.

6. A positioning apparatus as in claim 2 wherein an opening is provided through the panel to permit access to the actuating means from the front of the panel and auxiliary handle means are operatively connected to the actuating means and are accessible from the side of the panel to permit adjustment thereof in the event the opening through the panel is blocked.

References Cited

UNITED STATES PATENTS

| | | |
|---|---|---|
| 1,825,452 | 9/1931 | Harris. |
| 2,837,038 | 6/1958 | Fahland. |
| 2,958,873 | 11/1960 | Ferneau. |
| 3,017,843 | 1/1962 | Loomis et al. |
| 3,022,037 | 2/1962 | Stallard. |
| 3,095,830 | 7/1963 | Runken. |
| 3,168,055 | 2/1965 | Vander Hyde et al. |
| 3,176,629 | 4/1965 | Shaver. |
| 3,212,458 | 10/1965 | Robertson. |
| 3,344,750 | 10/1967 | Kostrewa. |

DRAYTON E. HOFFMAN, Primary Examiner